US012684182B2

(12) United States Patent
Link et al.

(10) Patent No.: US 12,684,182 B2
(45) Date of Patent: Jul. 14, 2026

(54) SYSTEMS AND METHODS FOR CONVERTING HYPERTEXT TRANSFER PROTOCOL (HTTP) LIVE STREAMING (HLS) STREAMS TO REAL-TIME BROADCAST STREAMS THAT INCLUDE CLOSED CAPTIONS AND SOCIETY OF CABLE AND TELECOMMUNICATIONS ENGINEERS (SCTE) MARKERS

(71) Applicant: SnifferCat, Inc., Los Angeles, CA (US)

(72) Inventors: Thomas Hamilton Link, Pasadena, CA (US); Keegan Browder, Aurora, CO (US); Christopher Todd McCarron, Windermere, FL (US)

(73) Assignee: SnifferCat, Inc., Los Angeles, CA (US)

( * ) Notice: Subject to any disclaimer, the term of this patent is extended or adjusted under 35 U.S.C. 154(b) by 84 days.

(21) Appl. No.: 18/622,250

(22) Filed: Mar. 29, 2024

(65) Prior Publication Data

US 2024/0357188 A1 Oct. 24, 2024

Related U.S. Application Data

(60) Provisional application No. 63/455,762, filed on Mar. 30, 2023.

(51) Int. Cl.
*H04N 21/235* (2011.01)

(52) U.S. Cl.
CPC ..... *H04N 21/2353* (2013.01); *H04N 21/2355* (2013.01)

(58) Field of Classification Search
CPC ...................... H04N 21/2353; H04N 21/2355
See application file for complete search history.

(56) References Cited

U.S. PATENT DOCUMENTS

| | | | |
|---|---|---|---|
| 11,069,378 B1 * | 7/2021 | Turgut | H04N 21/23424 |
| 11,218,784 B1 * | 1/2022 | Mekuria | H04N 21/84 |
| 2014/0300813 A1 | 10/2014 | Kellicker | |
| 2014/0304373 A1 | 10/2014 | Tarbox et al. | |
| 2021/0084389 A1 * | 3/2021 | Young | H04N 21/8547 |
| 2021/0319781 A1 * | 10/2021 | Gullo | G06F 40/166 |
| 2023/0138712 A1 * | 5/2023 | Ozawa | H04N 21/8456 709/219 |

* cited by examiner

*Primary Examiner* — Randy A Flynn

(74) *Attorney, Agent, or Firm* — Sheppard Mullin Richter & Hampton LLP

(57) ABSTRACT

A server system comprises one or more hardware processors; memory storing computer instructions executable by the one or more hardware processors, the computer instructions when executed by the one or more hardware processors causing the server system to perform: receiving TS files of an HLS data stream; receiving VTT files containing VTT closed caption segments; converting the VTT closed caption segments to 608/708 closed captions based on the CTA 608/708 specification; generating CC-enriched TS files using the TS files and the 608/708 closed captions; encoding SCTE markers into the CC-enriched TS files to generate SCTE/CC-enriched TS files; converting the SCTE/CC-enriched TS files to a real-time broadcast stream; and preparing the real-time broadcast stream for transmission to a consumer system.

16 Claims, 10 Drawing Sheets

112A

| |
|---|
| 202 — HLS CONTENT RECEIVING ENGINE |
| 204 — VTT FILES RECEIVING ENGINE |
| 206 — CLOSED CAPTION CONVERTER |
| 208 — CLOSED CAPTION INSERTION ENGINE |
| 210 — MANIFEST GENERATOR |

112C

BROADCASTING ENGINE

114

302 — HLS W/ CC-ENRICHED TS FILES RECEIVING ENGINE

304 — LOCAL CACHE

306 — SCTE MARKERS ENCODER

308 — OUTBOUND TRANSCODER

310 — PACKAGING ENGINE

312 — BROADCASTING ENGINE

400

402 — RECEIVE TS FILES OF AN HLS DATA STREAM

404 — RECEIVE VTT FILES

406 — CONVERT VTT FILES TO CTA 608/708

408 — INSERT CTA 608/708 CAPTIONS INTO TS FILES

410 — GENERATE MANIFEST

420

422 — RECEIVE MEDIA FILE

424 — RECEIVE VTT FILES

426 — CONVERT VTT FILES TO CTA 608/708

428 — ENCODE MP4 W/ CONVERTED CAPTIONS

430 — TRANSMUX MP4 TO HLS

432 — GENERATE MANIFEST

440

SYSTEMS AND METHODS FOR CONVERTING HYPERTEXT TRANSFER PROTOCOL (HTTP) LIVE STREAMING (HLS) STREAMS TO REAL-TIME BROADCAST STREAMS THAT INCLUDE CLOSED CAPTIONS AND SOCIETY OF CABLE AND TELECOMMUNICATIONS ENGINEERS (SCTE) MARKERS

PRIORITY CLAIM

This application claims benefit of and hereby incorporates by reference provisional patent application Ser. No. 63/455,762, entitled "Systems and Methods for Converting HLS Streams to Real-Time Broadcast Streams That Include Closed Captions and SCTE Markers," filed on Mar. 30, 2023, by inventor(s) McCarron et al.

TECHNICAL FIELD

This invention relates generally to media streams, and more particularly provides systems and methods configured to convert hypertext transfer protocol (HTTP) live streaming (HLS) streams to real-time broadcast streams that include closed captions and Society of Cable and Telecommunications Engineers (SCTE) markers.

BACKGROUND

Online content providers stream media content from a server system over a network to a consumer device. Because different consumer devices are connected to different networks with different or varying qualities, streaming protocols have been developed to provide adaptive bitrate streaming. Adaptive bitrate streaming protocols include HyperText Transfer Protocol (HTTP) Live Streaming (HLS) and Dynamic Adaptive Streaming over HTTP (DASH) (also known as MPEG-DASH). Generally, in adaptive bitrate streaming, the consumer device selects a multimedia stream from a plurality of variants based on the network quality available.

Content providers also provide real-time broadcast streaming (TV quality streams that can be used on cable networks and/or satellite) of multimedia content, which may include prerecorded or live multimedia content. Broadcast streaming protocols typically provide only a single bitrate stream (although not necessarily at a constant bitrate). Real-time broadcast streaming protocols may include Secure Reliable Transport (SRT), Real Time Messaging Protocol (RTMP), etc.

Systems and methods would be helpful that enable conversion of adaptive bitrate media transfer streams to real-time broadcast streams, especially that include closed captions and Society of Cable and Telecommunications Engineers (SCTE) markers.

SUMMARY

Embodiments of the invention provide a server system capable of conversion of adaptive bitrate media transfer streams to real-time broadcast streams (TV quality streams that can be used on cable networks and/or satellite), especially that include closed captions and Society of Cable and Telecommunications Engineers (SCTE) markers. Particular embodiments of the invention provide a server system, possibly cloud-based, configured to convert HyperText Transfer Protocol (HTTP) live streaming (HLS) streams to real-time broadcast streams that include closed captions and SCTE markers. In some embodiments, the server system includes a media processing system and a broadcasting system, although the functions of the media processing system and the broadcasting system can be part of a single system, distributed systems, etc. and can be segmented in almost any manner.

In some embodiments, the media processing system obtains TS files of an HLS steam for conversion to a real-time broadcast stream. Obtaining an HLS stream can occur in a variety of different ways, including via one of the following alternatives, namely, (a) receiving the TS files of an HLS stream from another source or (b) preparing content locally and generating the TS files of the HLS stream. As is known, HLS uses a manifest, which includes a master playlist, variant playlists and a closed caption playlist. The master playlist includes pointers to the variant playlists and to the closed caption playlist. Each variant playlist includes a different playlist of media content segments that make up a media content stream according to a different resolution and/or bitrate (e.g., 480p, 720p, 1080p and so on). Typically, the consumer system will select to playback the highest bitrate media content stream that the systems and network can handle. The closed caption playlist points to closed caption segments corresponding to the media content segments. In some embodiments, the closed caption playlist may be a Web Video Text to Track File (WebVTT or VTT) playlist, a SubRip Subtitle (SRT) playlist, or other side-cart closed caption protocol. The systems herein may focus on the VTT alternative although any playlist type may be used. Notably, the consumer system will use a particular variant playlist and the VTT playlist to retrieve the media content segments and the closed caption segments using MPEG-2 Transport Stream (TS) files. Each TS file containing media content segments or closed caption segments may include, for example, four, six or ten seconds of media content or closed caption content.

The media processing system may use the HLS manifest to retrieve TS files of the HLS stream containing the media content segments using the highest bitrate variant provided in the variant playlists. The media processing system may use the closed caption playlist to retrieve the VTT files containing the closed caption segments.

In some embodiments, the media processing system converts the closed caption segments into closed captions pursuant to Consumer Technology Association (CTA) 608/708 standards. In some embodiments, the media processing system inserts the CTA 608/708 closed captions into the TS files at their appropriate time locations. The TS files may be considered "CC-enriched" because the TS files are now encoded with 608/708 closed captions, rather than separate VTT files. In some embodiments, the media processing system may alternatively generate an MP4 file from the retrieved TS files of the HLS stream, and may embed the 608/708 closed captions into the MP4 file, rather than into the TS files, and then may transcode the MP4 file into the CC-enriched TS files. In some embodiments, generating the CC-enriched TS files can occur on an external system, such as by the content provider.

In some embodiments, the media processing system will generate a reduced manifest that includes a single variant playlist to the CC-enriched TS files. The manifest may be considered "reduced" because the manifest need not point to any VTT playlist, as the closed captions have been embedded in the CC-enriched TS files.

In real time, the broadcasting system obtains the reduced manifest, possibly via a link to the reduced manifest. In some embodiments, the broadcasting system can access the TS files stored in a local storage without a reduced manifest. The broadcasting system retrieves the CC-enriched TS files in real time, and extracts the SCTE markers from the CC-enriched TS files or from the reduced manifest. The broadcasting system updates a program mapping table (PMT) to register the SCTE marker packet identifier (PID) and type (e.g., identifier 600 with type SCTE-35). The broadcasting system splice inserts the SCTE markers into the tags of the CC-enriched TS files to generate SCTE/CC enriched TS files. In some embodiments, the broadcasting system then builds a new manifest to the CC-enriched TS files. In some embodiments, the same reduced manifest may be used.

Based on the target system, the broadcasting system repackages (transmuxes) the SCTE/CC-enriched TS files into a real-time broadcast stream in the real-time broadcast format based on the target network (e.g., SRT, single-variant HLS, RTMP, etc.). The broadcasting system then either sources or outsources the broadcasting of the real-time broadcast stream in a push or pull format. In some embodiments, the broadcasting system may be configured to push the real-time broadcast stream to a hosted server or to push the real-time broadcast stream to a local relay server so clients can pull the real-time broadcast stream from the relay server.

In some embodiments, the present invention may provide a server system comprising one or more hardware processors; memory storing computer instructions executable by the one or more hardware processors, the computer isntruc-tions when executed by the one or more hardware processors causing the server system to perform: receiving Transport Stream (TS) files of a HyperText Transfer Protocol (HTTP) live streaming (HLS) data stream; receiving Web Video Text to Track (VTT) files containing VTT closed caption (CC) segments; converting the VTT closed caption segments to 608/708 closed captions based on the Consumer Technology Association (CTA) 608/708 specification; generating CC-enriched TS files using the TS files and the 608/708 closed captions; encoding Society of Cable and Telecommunica-tions Engineers (SCTE) markers into the CC-enriched TS files to generate SCTE/CC-enriched TS files; converting the SCTE/CC-enriched TS files to a real-time broadcast stream; and preparing the real-time broadcast stream for transmis-sion to a consumer system.

The server system may be distributed across a network. The receiving the TS files may include using a variant playlist to retrieve a highest bitrate media content stream. The generating the CC-enriched TS files includes inserting the 608/708 closed captions into the TS files to generate the CC-enriched TS files. The generating the CC-enriched TS files may include generating an MP4 data stream, inserting the 608/708 closed captions into the MP4 data stream, and converting the MP4 data stream to the CC-enriched TS files. The real-time broadcast stream may include an SRT stream, an RTMP stream or a single-variant HLS stream. The server system may further comprise generating a reduced manifest without a VTT playlist. The receiving the TS files of an HLS data stream may include receiving the TS files from a content provider system remote from the server system.

In some embodiments, the present invention may provide a method comprising receiving Transport Stream (TS) files of a HyperText Transfer Protocol (HTTP) live streaming (HLS) data stream; receiving Web Video Text to Track (VTT) files containing VTT closed caption (CC) segments; converting the VTT closed caption segments to 608/708 closed captions based on the Consumer Technology Association (CTA) 608/708 specification; generating CC-en-riched TS files using the TS files and the 608/708 closed captions; encoding Society of Cable and Telecommunica-tions Engineers (SCTE) markers into the CC-enriched TS files to generate SCTE/CC-enriched TS files; converting the SCTE/CC-enriched TS files to a real-time broadcast stream; and preparing the real-time broadcast stream for transmis-sion to a consumer system.

The method may be performed by a server system dis-tributed across a network. The receiving the TS files may include using a variant playlist to retrieve a highest bitrate media content stream. The generating the CC-enriched TS files may include inserting the 608/708 closed captions into the TS files to generate the CC-enriched TS files. The generating the CC-enriched TS files may include generating an MP4 data stream, inserting the 608/708 closed captions into the MP4 data stream, and converting the MP4 data stream to the CC-enriched TS files. The real-time broadcast stream may include an SRT stream, an RTMP stream, or a single-variant HLS stream. The method may further com-prise generating a reduced manifest without a VTT playlist. The receiving the TS files of an HLS data stream may include receiving the TS files from a content provider system.

DETAILED DESCRIPTION

Figure 1:
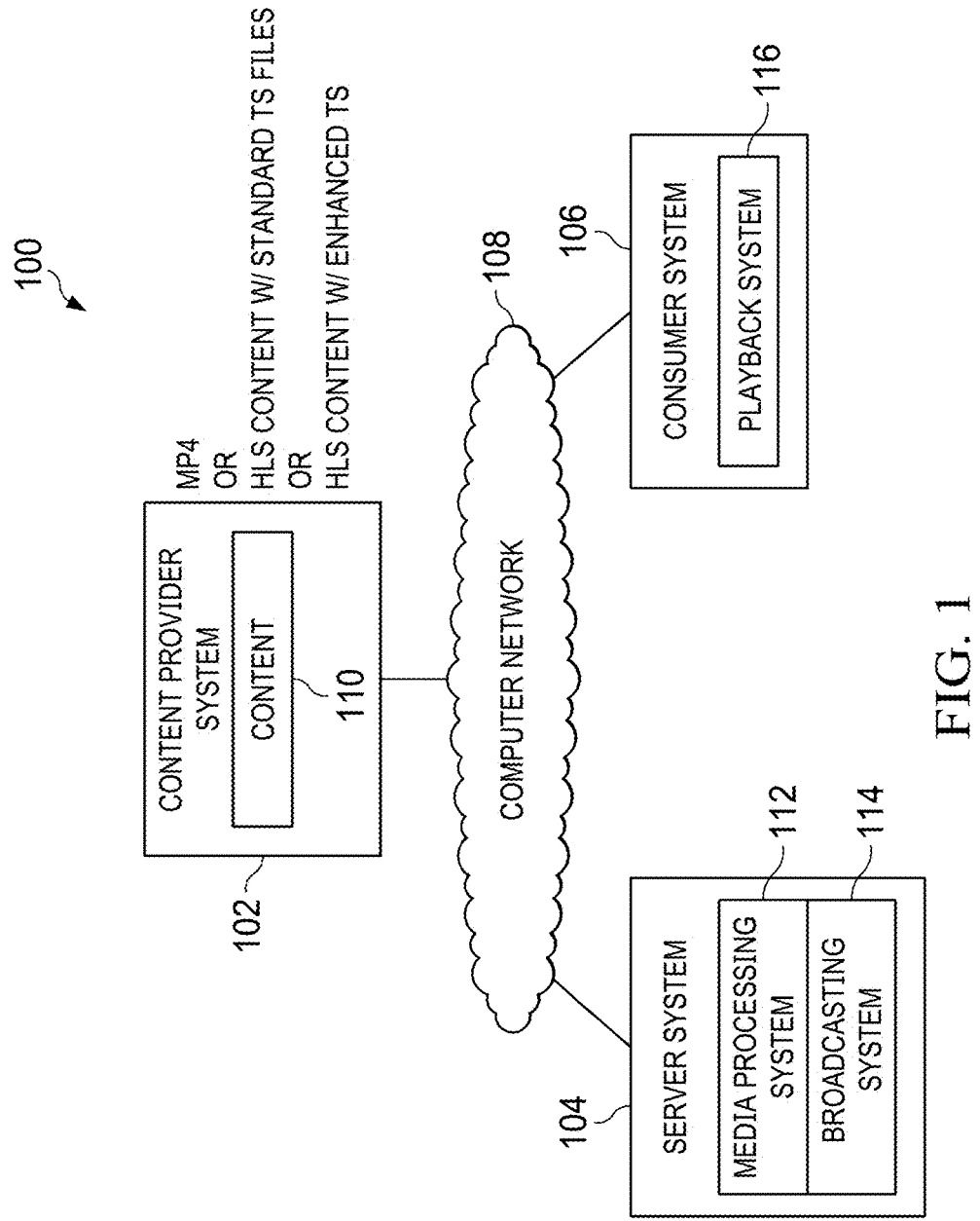
FIG. 1 is block diagram illustrating a network system configured to convert adaptive bitrate streams to real-time broadcast streams that include closed captions and SCTE markers, in accordance with embodiments of the present invention.

The following description is provided to enable a person skilled in the art to make and use various embodiments of the invention. Modifications are possible. The generic principles defined herein may be applied to the disclosed and other embodiments without departing from the spirit and scope of the invention. Thus, the claims are not intended to be limited to the embodiments disclosed, but are to be accorded the widest scope consistent with the principles, features and teachings herein.

Embodiments of the invention provide a server system capable of conversion of adaptive bitrate media transfer streams to real-time broadcast streams (TV quality streams that can be used on cable networks and/or satellite), especially that include closed captions and Society of Cable and Telecommunications Engineers (SCTE) markers. Particular embodiments of the invention provide a server system, possibly cloud-based, configured to convert HyperText Transfer Protocol (HTTP) live streaming (HLS) streams to real-time broadcast streams that include closed captions and SCTE markers. In some embodiments, the server system includes a media processing system and a broadcasting system, although the functions of the media processing system and the broadcasting system can be part of a single system, distributed systems, etc. and can be segmented in almost any manner.

In some embodiments, the media processing system obtains TS files of an HLS steam for conversion to a real-time broadcast stream. Obtaining an HLS stream can occur in a variety of different ways, including via one of the following alternatives, namely, (a) receiving the TS files of an HLS stream from another source or (b) preparing content locally and generating the TS files of the HLS stream. As is known, HLS uses a manifest, which includes a master playlist, variant playlists and a closed caption playlist. The master playlist includes pointers to the variant playlists and to the closed caption playlist. Each variant playlist includes a different playlist of media content segments that make up a media content stream according to a different resolution and/or bitrate (e.g., 480p, 720p, 1080p and so on). Typically, the consumer system will select to playback the highest bitrate media content stream that the systems and network can handle. The closed caption playlist points to closed caption segments corresponding to the media content segments. In some embodiments, the closed caption playlist may be a Web Video Text to Track File (WebVTT or VTT) playlist, a SubRip Subtitle (SRT) playlist, or other side-cart closed caption protocol. The systems herein may focus on the VTT alternative although any playlist type may be used. Notably, the consumer system will use a particular variant playlist and the VTT playlist to retrieve the media content segments and the closed caption segments using MPEG-2 Transport Stream (TS) files. Each TS file containing media content segments or closed caption segments may include, for example, four, six or ten seconds of media content or closed caption content.

The media processing system may use the HLS manifest to retrieve TS files of the HLS stream containing the media content segments using the highest bitrate variant provided in the variant playlists. The media processing system may use the closed caption playlist to retrieve the VTT files containing the closed caption segments.

In some embodiments, the media processing system converts the closed caption segments into closed captions pursuant to Consumer Technology Association (CTA) 608/708 standards. In some embodiments, the media processing system inserts the CTA 608/708 closed captions into the TS files at their appropriate time locations. The TS files may be considered "CC-enriched" because the TS files are now encoded with 608/708 closed captions, rather than separate VTT files. In some embodiments, the media processing system may alternatively generate an MP4 file from the retrieved TS files of the HLS stream, and may embed the 608/708 closed captions into the MP4 file, rather than into the TS files, and then may transcode the MP4 file into the CC-enriched TS files. In some embodiments, generating the CC-enriched TS files can occur on an external system, such as by the content provider.

In some embodiments, the media processing system will generate a reduced manifest that includes a single variant playlist to the CC-enriched TS files. The manifest may be considered "reduced" because the manifest need not point to any VTT playlist, as the closed captions have been embedded in the CC-enriched TS files.

In real time, the broadcasting system obtains the reduced manifest, possibly via a link to the reduced manifest. In some embodiments, the broadcasting system can access the TS files stored in a local storage without a reduced manifest. The broadcasting system retrieves the CC-enriched TS files in real time, and extracts the SCTE markers from the CC-enriched TS files or from the reduced manifest. The broadcasting system updates a program mapping table (PMT) to register the SCTE marker packet identifier (PID) and type (e.g., identifier 600 with type SCTE-35). The broadcasting system splice inserts the SCTE markers into the tags of the CC-enriched TS files to generate SCTE/CC enriched TS files. In some embodiments, the broadcasting system then builds a new manifest to the CC-enriched TS files. In some embodiments, the same reduced manifest may be used.

Based on the target system, the broadcasting system repackages (transmuxes) the SCTE/CC-enriched TS files into a real-time broadcast stream in the real-time broadcast format based on the target network (e.g., SRT, single-variant HLS, RTMP, etc.). The broadcasting system then either sources or outsources the broadcasting of the real-time broadcast stream in a push or pull format. In some embodiments, the broadcasting system may be configured to push the real-time broadcast stream to a hosted server or to push the real-time broadcast stream to a local relay server so clients can pull the real-time broadcast stream from the relay server.

FIG. 1 is block diagram illustrating a network system 100 configured to convert adaptive bitrate streams (e.g., HLS streams) to real-time broadcast streams that include closed captions and SCTE markers, in accordance with embodiments of the present invention. Although the systems and methods herein are being described with regard to HLS streams, other embodiments may convert a different adaptive bitrate streaming protocol. The network system 100 includes a content provider system 102, a server system 104, and a consumer system 106, each coupled together via a computer network 108. The content provider system 102 includes content 110 in need of conversion to a real-time broadcast stream. The server system 104 includes a media processing system 112 and a broadcasting system 114 together configured to convert an HLS stream to a real-time broadcast stream that includes closed captions and SCTE markers, in accordance with embodiments of the present invention. As indicated above, although the media processing system 112 and the broadcasting system 114 are shown as separate systems on a single server, the functions provided thereby can be implemented in distributed systems and can be segmented in almost any manner. The consumer system 106 includes a playback system 116 configured to playback a real-time broadcast stream that includes closed captions and SCTE markers. Although the systems herein are being described with regard to SCTE-type markers, embodiments may be implemented that use other content insertion marking protocol.

In some embodiments, the media processing system 112 obtains the TS files of an HLS steam for conversion to a real-time broadcast stream. Obtaining the TS files of an HLS stream can occur in a variety of different ways, including via one of the following alternatives, namely, (a) receiving the TS files of an HLS stream from another source or (b) preparing content locally and generating the HLS stream. In some embodiments, the media processing system 112 is configured to use the HLS manifest to retrieve TS files containing the media content segments using the highest bitrate variant provided in the variant playlists.

The media processing system 112 is also configured to retrieve the VTT files containing the closed caption segments, and configured to convert the VTT-based closed caption segments into closed captions pursuant to Consumer Technology Association (CTA) 608/708 standards. The media processing system 112 is configured to insert the CTA 608/708 closed captions into the TS files at their appropriate time locations. As indicated above, the TS files may be considered "CC-enriched" because the TS files are now encoded with 608/708 closed captions, rather than separate VTT files. In some embodiments, the media processing system 112 may alternatively be configured to generate an MP4 file from the retrieved TS files, and may embed the 608/708 closed captions into the MP4 file, rather than directly into the TS file. The media processing system 112 may be configured to transcode the MP4 file into the CC-enriched TS files. Although embodiments herein are being described as using MP4, other embodiments may use a different single (non-adaptive) bitrate format such as MOV.

The real-time CTA 608/708 insertion process correlates timing on the VTT playlist with a single-variant for broadcast on the individual TS files. Whether performing the CTA 608/708 insertion on an MP4 or TS file, the enrichment occurs generally the same way, namely, a bitstream filter is applied which enriches the video streams to include "picture user data."

In some embodiments, the media processing system 112 may be located on an external system, such as on the content provider system 102, so that the server system 104 (either the media processing system 112 or the broadcasting system 114) can obtain the CC-enriched TS files directly from the content provider system 102.

In some embodiments, the media processing system 112 is configured to receive media content, which it possibly uses to create an MP4 data stream. The media processing system 112 is configured to retrieve the VTT files containing the VTT-based closed caption segments, and configured to convert the VTT-based closed caption segments into CTA 608/708 closed captions pursuant to CTA 608/708 standards. The media processing system 112 is configured to insert the CTA 608/708 closed captions into the MP4 file, and then to convert the MP4 file into the CC-enriched TS files.

In some embodiments, the media processing system 112 is configured to generate a reduced manifest that includes a single variant playlist to the CC-enriched TS files. The manifest may be considered "reduced" because the manifest need not point to any VTT playlist, as the closed captions have been embedded in the CC-enriched TS files.

In some embodiments, in real time, the broadcasting system 114 is configured to obtain the reduced manifest, possibly via a link to the reduced manifest. In some embodiments, the broadcasting system 114 is configured to access the CC-enriched TS files stored in a local storage without a reduced manifest. The broadcasting system 114 is configured to retrieve the CC-enriched TS files, store then in a local cache, and extract the SCTE markers from the CC-enriched TS files or from the reduced manifest. The broadcasting system 114 is configured to update a program mapping table (PMT) to register the SCTE marker packet identifier (PID) and type (e.g., identifier 600 with type SCTE-35). The broadcasting system 114 is configured to splice insert the SCTE markers into the tags of the CC-enriched TS files to generate SCTE/CC enriched TS files. The broadcasting system 114 is configured to build a new manifest to the SCTE/CC-enriched TS files if needed.

Based on the target system, the broadcasting system 114 is configured to repackage (transmux) the SCTE/CC-enriched TS files into a real-time broadcast stream in a real-time broadcast format based on the target network (e.g., SRT, single-variant HLS, RTMP, etc.). The broadcasting system 114 is configured to either source or outsource the broadcasting of the real-time broadcast stream in a push or pull format. In some embodiments, the broadcasting system 114 may be configured to push the real-time broadcast stream to a hosted server or to push the real-time broadcast stream to a local relay server so clients can pull the real-time broadcast stream from the relay server.

Figure 2A:
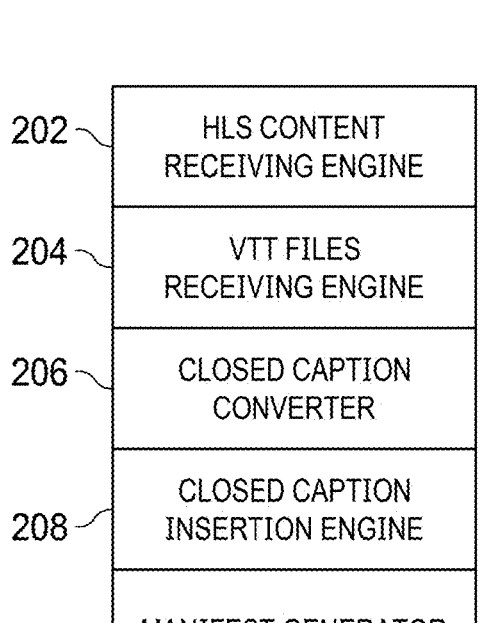
FIG. 2A is a block diagram illustrating a media processing system, in accordance with some embodiments of the pres-ent invention.

FIG. 2A is a block diagram illustrating a media processing system 112A, in accordance with some embodiments of the present invention. The media processing system 112A includes an HLS content receiving engine 202, a VTT files receiving engine 204, a closed caption converter 206, a closed caption insertion engine 208, and a manifest generator 210.

In some embodiments, the HLS content receiving engine 202 is configured to obtain the TS files of an HLS steam for conversion to a real-time broadcast stream. In some embodiment, the HLS content receiving engine 202 is configured to use the HLS manifest to retrieve the TS files of the HLS stream containing the media content segments using the highest bitrate variant provided in the variant playlists.

The VTT files receiving engine 204 includes hardware, software and/or firmware configured to retrieve VTT files containing the closed caption segments.

The closed caption converter 206 includes hardware, software and/or firmware configured to convert the VTT-based closed caption segments into 608/708 closed captions pursuant to Consumer Technology Association (CTA) 608/708 standards.

The closed caption insertion engine 208 includes hardware, software and/or firmware configured to insert the CTA 608/708 closed captions into the TS files at their appropriate time locations. As indicated above, the TS files may be considered "CC-enriched" because the TS files are now encoded with 608/708 closed captions, rather than separate VTT files.

The manifest generator 210 includes hardware, software and/or firmware configured to generate a reduced manifest that includes a single variant playlist to the CC-enriched TS files. As indicated above, the manifest may be considered "reduced" because the manifest need not point to any VTT playlist, as the 608/708 closed captions have been embedded in the CC-enriched TS files.

Figure 2B:
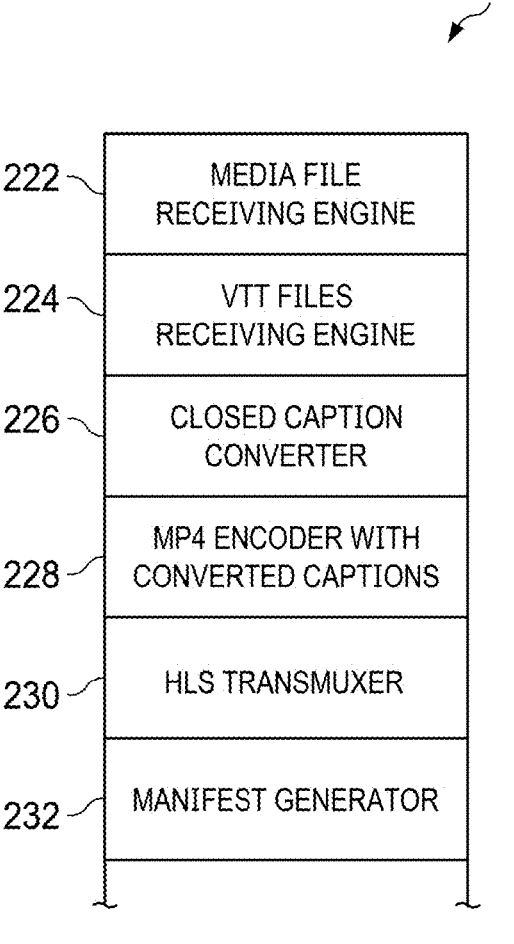
FIG. 2B is a block diagram illustrating a media processing system, in accordance with some embodiments of the pres-ent invention.

FIG. 2B is a block diagram illustrating a media processing system 112B, in accordance with some embodiments of the present invention. The media processing system 112B includes a media file receiving engine 222, a VTT files receiving engine 224, a closed caption converter 226, an MP4 encoder 228, an HLS transmuxer 230, and a manifest generator 232.

The media file receiving engine 222 includes hardware, software and/or firmware configured to obtain a media file for conversion.

The VTT files receiving engine 224 includes hardware, software and/or firmware configured to retrieve the VTT files containing the VTT-based closed caption segments.

The closed caption converter 226 includes hardware, software and/or firmware configured to convert the VTT-based closed caption segments into 608/708 closed captions pursuant to CTA 608/708 standards.

The MP4 encoder 228 includes hardware, software and/or firmware configured to insert the CTA 608/708 closed captions into the MP4 file.

The HLS transmuxer 230 includes hardware, software and/or firmware configured to transmux the MP4 file into CC-enriched TS files.

The manifest generator 232 includes hardware, software and/or firmware configured to generate a reduced manifest that includes a single variant playlist to the CC-enriched TS files. As indicated above, the manifest may be considered "reduced" because the manifest need not point to any VTT playlist, as the closed captions have been embedded in the CC-enriched TS files.

Figure 2C:
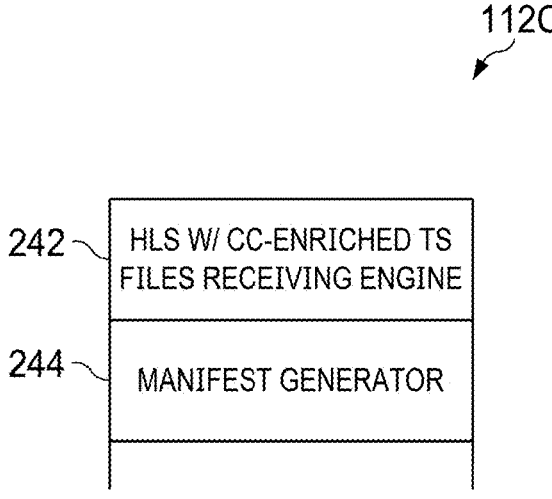
FIG. 2C is a block diagram illustrating a media processing system, in accordance with some embodiments of the pres-ent invention.

FIG. 2C is a block diagram illustrating a media processing system 112C, in accordance with some embodiments of the present invention. The media processing system 112C includes an HLS with CC-enriched TS files receiving engine 242 and a manifest generator 244.

As indicated above, in some embodiments, the content provider system 102 may generate the CC-enriched TS files. Accordingly, the HLS with CC-enriched TS files receiving engine 242 may include hardware, software and/or firmware configured to receive the CC-enriched TS files directly from the content provider system 102.

The manifest generator 244 includes hardware, software and/or firmware configured to generate a reduced manifest that includes a single variant playlist to the CC-enriched TS files. As indicated above, the manifest may be considered "reduced" because the manifest need not point to any VTT file, as the 608/708 closed captions have been embedded in the CC-enriched TS files.

Figure 3:
FIG. 3 is a block diagram illustrating a broadcasting system, in accordance with some embodiments of the pres-ent invention.
Figure 3:
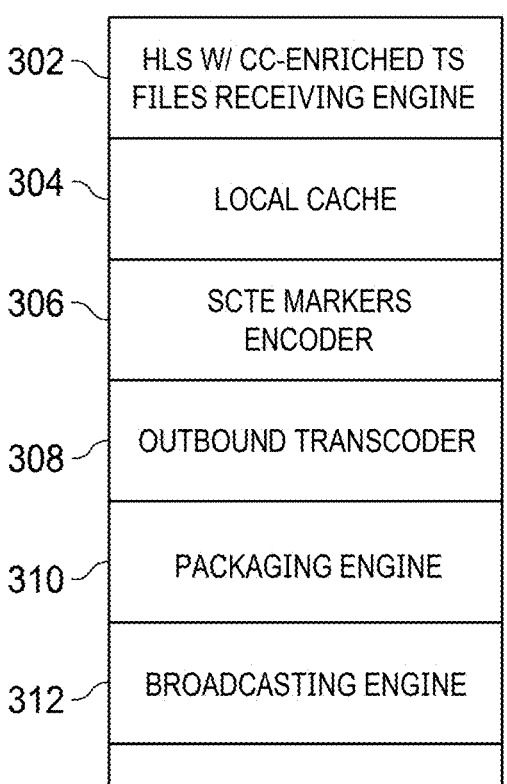

FIG. 3 is a block diagram illustrating a broadcasting system 114, in accordance with some embodiments of the present invention. The broadcasting system 114 includes an HLS with CC-enriched TS files receiving engine 302, a local cache 304, a SCTE markers encoder 306, an outbound transcoder 308, a packaging engine 310, and a broadcasting engine 312.

The HLS with CC-enriched TS files receiving engine 302 includes hardware, software and/or firmware configured to receive in real time the TS files from the media processing engine 112 or directly from the content provider system 102. In some embodiments, the HLS with CC-enriched TS files receiving engine 302 is configured to obtain the reduced manifest, possibly via a link to the reduced manifest. The HLS with CC-enriched TS files receiving engine 302 is configured to use the reduced manifest to retrieve the CC-enriched TS files, and store then in the local cache 304. In some embodiments, the HLS with CC-enriched TS files receiving engine 302 is configured to access the CC-enriched TS files stored in a local storage without a reduced manifest.

The SCTE markers encoder 306 includes hardware, software and/or firmware configured to extract the SCTE markers from the CC-enriched TS files or manifest (CUE-OUT and/or CUE-IN). The SCTE markers encoder 304 is further configured to update a program mapping table (PMT) to register the SCTE marker packet identifier (PID) and type (e.g., identifier 600 with type SCTE-35). The SCTE markers encoder 304 is further configured to splice insert the SCTE markers into the tags of the CC-enriched TS files to generate SCTE/CC enriched TS files.

While it is possible to perform all of the SCTE-35 enrichment on the TS files ahead of broadcast, embodiments of the present invention may do this in near real-time (e.g., seconds ahead of the broadcasting) in order to provide the ability to dynamically schedule ad-breaks or send a signal to perform an early cue-in from an active cue-out/ad-break. The SCTE markers encoder 306 may consume a single-variant m3u8 playlist containing the broadcast A/V streams. The SCTE markers encoder 306 may annotate each TS file with a SCTE marker (cue-out with duration, cue-in). Every TS file in the stream may have the PMT (program mapping table) updated to register the Packet ID (PID) and type which enables downstream decoders to identify which packets are in the SCTE-35 splice-insert data format. The type for splice-insert may be 0x86 (defined by the specification,) but the PID can be any unique number to the stream. In some embodiments, the SCTE markers encoder 306 may use 600. Every TS file will have the PMT table updated to register the 600/0x86 packet on the stream, although only TS files that contain a splice insert (cue-out) will have additional packets with PID 600 added. The cue-in signal is only sent if we need to cancel an existing splice-insert (cue-out) ahead of the time/duration prescribed at the time the cue-out was sent.

The outbound transcoder 308 includes hardware, software and/or firmware configured to transcode the SCTE/CC enriched TS files into a target format as needed by the target system. In some embodiments, the target format may include SRT, single variant HLS, RTMP or other. If needed, the outbound transcoder 308 may include a manifest generator configured to build a new manifest to the SCTE/CC-enriched TS files.

The packaging engine 310 includes hardware, software and/or firmware configured to repackage (transmux) the transcoded files or the SCTE/CC-enriched TS files into a real-time broadcast stream in the real-time broadcast format (MP4, MPEG-TS, Flash, HLS, etc.) based on the target network.

The broadcasting engine 312 includes hardware, software and/or firmware configured to either source or outsource the broadcasting of the real-time broadcast stream in a push or pull format. In some embodiments, the broadcasting engine 312 is configured to push the real-time broadcast stream to a hosted server or to push the real-time broadcast stream to a local relay server so clients can pull the real-time broadcast from the relay server.

Figure 4A:
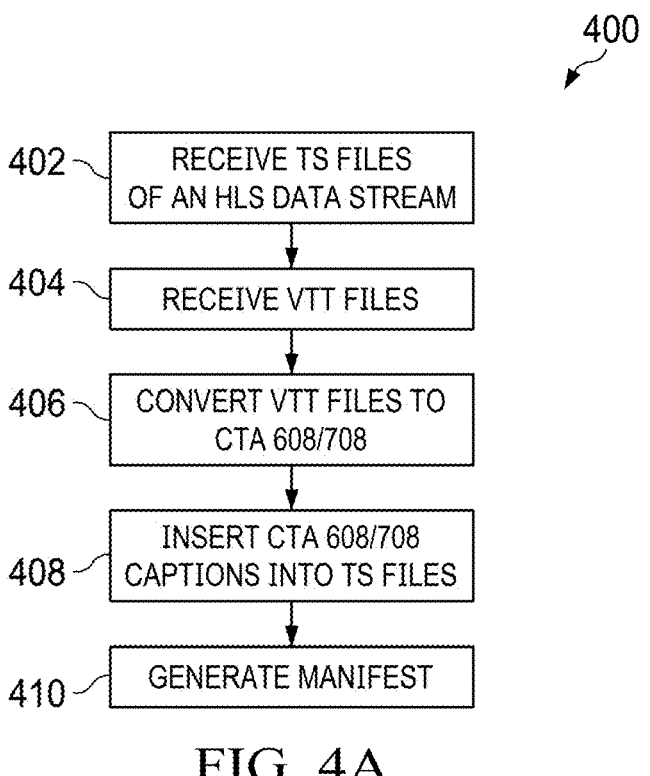
FIG. 4A is a flowchart illustrating a media processing method of the media processing system of FIG. 2A, in accordance with some embodiments of the present inven-tion.

FIG. 4A is a flowchart illustrating a media processing method 400 of the media processing system 112A, in accordance with some embodiments of the present invention.

The method 400 begins in step 202 with the HLS content receiving engine 202 obtaining TS files of an HLS steam for conversion to a real-time broadcast stream. In some embodiments, the HLS content receiving engine 202 uses the HLS manifest to retrieve the TS files of the HLS stream containing the media content segments using the highest bitrate variant provided in the variant playlists.

In step 204, the VTT files receiving engine 204 retrieves VTT files containing the closed caption segments.

In step 206, the closed caption converter 206 converts the VTT-based closed caption segments into 608/708 closed captions pursuant to Consumer Technology Association (CTA) 608/708 standards.

In step 208, the closed caption insertion engine 208 inserts the CTA 608/708 closed captions into the TS files at their appropriate time locations. The TS files may be considered "CC enriched" because the TS files are now encoded with 608/708 closed captions, rather than separate VTT files.

In step 210, the manifest generator 210 generates a reduced manifest that includes a single variant playlist to the CC-enriched TS files. The manifest may be considered "reduced" because the manifest need not point to any VTT playlist, as the 608/708 closed captions have been embedded in the CC-enriched TS files.

Figure 4B:
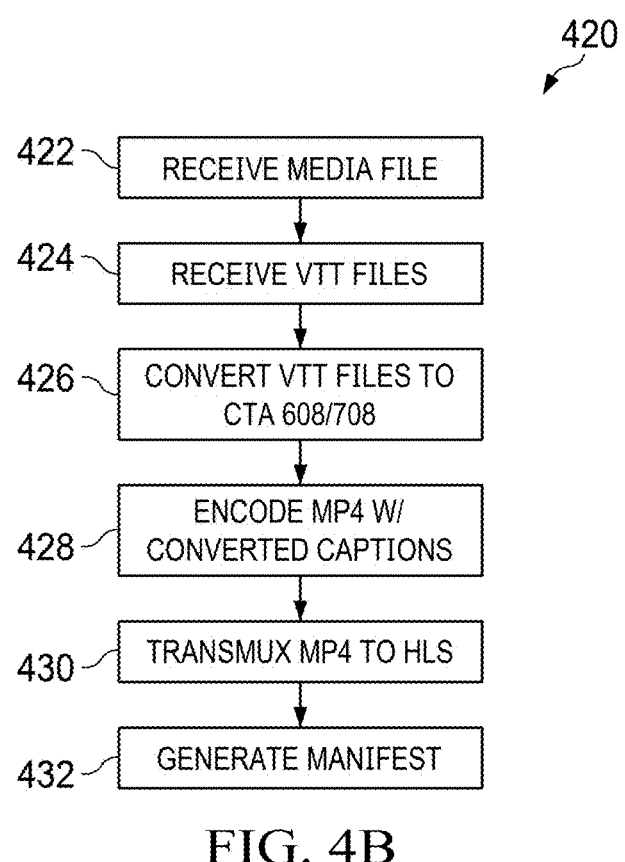
FIG. 4B is a flowchart illustrating a media processing method of the media processing system of FIG. 2B, in accordance with some embodiments of the present inven-tion.

FIG. 4B is a flowchart illustrating a media processing method 420 of the media processing system 112B, in accordance with some embodiments of the present invention.

The method 420 begins in step 422 with the media file receiving engine 222 obtaining a media file for conversion.

In step 424, the VTT files receiving engine 224 retrieves the VTT files containing the VTT-based closed caption segments.

In step 426, the closed caption converter 226 converts the VTT-based closed caption segments into 608/708 closed captions pursuant to CTA 608/708 standards.

In step 428, the MP4 encoder 228 inserts the CTA 608/708 closed captions into the MP4 file.

In step 430, the HLS transmuxer 230 transmuxes the MP4 file into CC-enriched TS files.

In step 432, the manifest generator 232 generates a reduced manifest that includes a single variant playlist to the CC-enriched TS files. As indicated above, the manifest may be considered "reduced" because the manifest need not point to any VTT file, as the 608/708 closed captions have been embedded in the CC-enriched TS files.

Figure 4C:
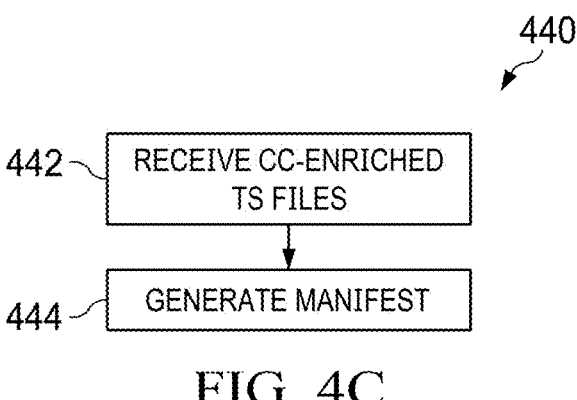
FIG. 4C is a flowchart illustrating a media processing method of the media processing system of FIG. 2C, in accordance with some embodiments of the present inven-tion.

FIG. 4C is a flowchart illustrating a media processing method 440 of the media processing system 112C, in accordance with some embodiments of the present invention.

The method 440 begins in step 442 with the HLS with CC-enriched TS files receiving engine 242 receiving the CC-enriched TS files directly from the content provider system 102.

In step 444, the manifest generator 244 generates a reduced manifest that includes a single variant playlist to the CC-enriched TS files. As indicated above, the manifest may be considered "reduced" because the manifest need not point to any VTT playlist, as the closed captions have been embedded in the CC-enriched TS files.

Figure 5:
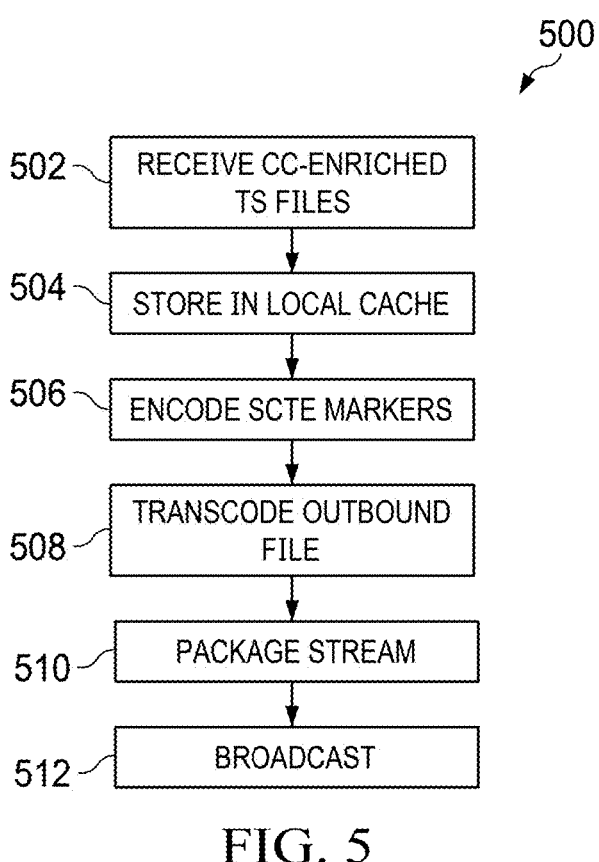
FIG. 5 is a flowchart illustrating a broadcasting method, in accordance with some embodiments of the present inven-tion.

FIG. 5 is a flowchart illustrating a broadcasting method 500, in accordance with some embodiments of the present invention.

The method 500 begins in step 502 with the HLS with CC-enriched TS files receiving engine 302 receiving in real time the CC-enriched TS files from the media processing engine 112 or directly from the content provider system 102. In some embodiments, the HLS with CC-enriched TS files receiving engine 302 obtains the reduced manifest, possibly via a link to the reduced manifest. The HLS with CC-enriched TS files receiving engine 302 retrieves the CC-enriched TS files.

In step 504, the HLS with CC-enriched TS files receiving engine 302 stores the CC-enriched TS files in the local cache 304.

In step 506, the SCTE markers encoder 306 extracts the SCTE markers from the CC-enriched TS files or from the reduced manifest. The SCTE markers encoder 304 updates a program mapping table (PMT) to register the SCTE marker packet identifier (PID) and type (e.g., identifier 600 with type SCTE-35). The SCTE markers encoder 304 splice inserts the SCTE markers into the tags of the CC-enriched TS files to generate SCTE/CC enriched TS files.

In step 508, the outbound transcoder 308 transcodes the SCTE/CC enriched TS files into a target format as needed by the target system. In some embodiments, the target format may include SRT, single variant HLS, RTMP, or other. If needed, the outbound transcoder 308 may include a manifest generator configured to build a new manifest to the SCTE/CC-enriched TS files.

In step 510, the packaging engine 310 repackages (transmuxes) the transcoded files or the SCTE/CC-enriched TS files into a real-time broadcast stream in the real-time broadcast format (MP4, MPEG-TS, Flash, HLS, etc.) based on the target network.

In step 512, the broadcasting engine 312 either sources or outsources the broadcasting of the real-time broadcast stream in a push or pull format. In some embodiments, the broadcasting engine 312 is configured to push the real-time broadcast stream to hosted server or to push the real-time broadcast stream to a local relay server so clients can pull the real-time broadcast from the relay server.

Figure 6:
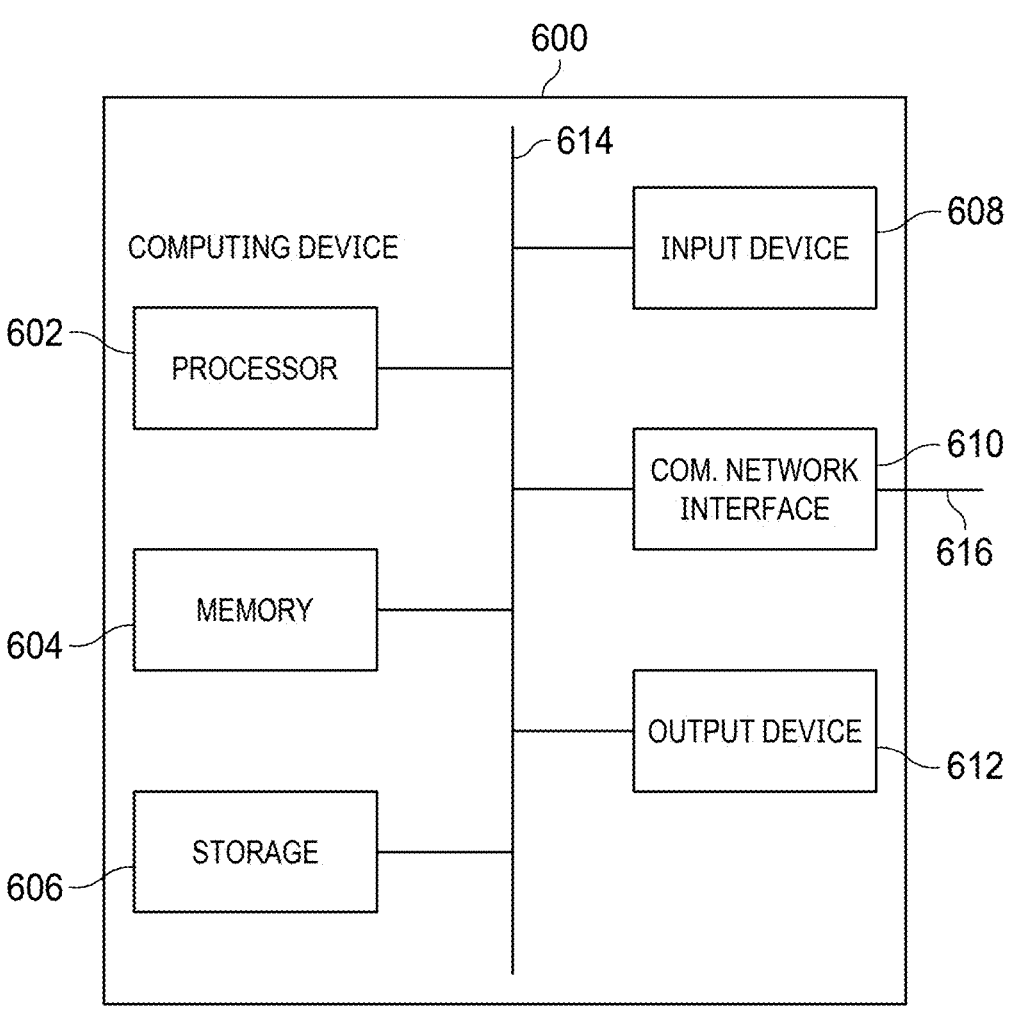
FIG. 6 is a block diagram illustrating details of a computer system, of which each of content provider, server system and consumer system may be an instance, in accordance with some embodiments of the present invention.

FIG. 6 is a block diagram illustrating details of a computer system 600, of which each of content provider, server system and consumer system may be an instance, in accordance with some embodiments of the present invention.

In some example embodiments, functionality of the computing system 600 is improved to perform some or all of the functionality described herein. The computing system 600 comprises a processor 602, memory 604, storage 606, an input device 608, a communication network interface 610, and an output device 612 communicatively coupled to a communication channel 614. The processor 602 is configured to execute executable instructions (e.g., programs). In some example embodiments, the processor 602 comprises circuitry or any processor capable of processing the executable instructions.

The memory 604 stores data. Some examples of memory 604 include storage devices, such as RAM, ROM, RAM cache, virtual memory, etc. In various embodiments, working data is stored within the memory 604. The data within the memory 604 may be cleared or ultimately transferred to the storage 606.

The storage 606 includes any storage configured to retrieve and store data. Some examples of the storage 606 include flash drives, hard drives, optical drives, cloud storage, and/or magnetic tape. Each of the memory 604 and the storage 606 comprises a computer-readable medium, which stores instructions or programs executable by processor 602.

The input device 608 is any device that inputs data (e.g., mouse and keyboard). The output device 612 outputs data (e.g., a speaker or display). It will be appreciated that the storage 606, input device 608, and output device 610 may be optional. For example, the routers/switchers may comprise the processor 602 and memory 604 as well as a device to receive and output data (e.g., the communication network interface 610 and/or the output device 612).

The communication network interface 610 may be coupled to a network (e.g., network 108) via the link 616. The communication network interface 610 may support communication over an Ethernet connection, a serial connection, a parallel connection, and/or an ATA connection. The communication network interface 610 may also support wireless communication (e.g., 802.11 a/b/g/n, WiMax, LTE, WiFi). It will be apparent that the communication network interface 610 may support many wired and wireless standards.

It will be appreciated that the hardware elements of the computing device 1102 are not limited to those depicted herein. A computing device 600 may comprise more or less hardware, software and/or firmware components than those depicted (e.g., drivers, operating systems, touch screens, biometric analyzers, and/or the like). Further, hardware elements may share functionality and still be within various embodiments described herein. In one example, encoding and/or decoding may be performed by the processor 602 and/or a co-processor located on a GPU (i.e., NVidia).

It will be appreciated that an "engine," "system," "datastore," and/or "database" may comprise software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently. The datastore or database may include cloud storage. It will further be appreciated that the term "or," as used herein, may be construed in either an inclusive or exclusive sense. Moreover, plural instances may be provided for resources, operations, or structures described herein as a single instance.

The datastores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

The systems, methods, engines, datastores, and/or databases described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The foregoing description of the preferred embodiments of the present invention is by way of example only, and other variations and modifications of the above-described embodiments and methods are possible in light of the foregoing teaching. Although the network sites are being described as separate and distinct sites, one skilled in the art will recognize that these sites may be a part of an integral site, may each include portions of multiple sites, or may include combinations of single and multiple sites. The various embodiments set forth herein may be implemented utilizing hardware, software, or any desired combination thereof. For that matter, any type of logic may be utilized which is capable of implementing the various functionality set forth herein. Components may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

The invention claimed is:

1. A server system comprising:
   one or more hardware processors;
   memory storing computer instructions executable by the one or more hardware processors, the computer instructions when executed by the one or more hardware processors causing the server system to perform:
   by a media processing system,
      using a HyperText Transfer Protocol (HTTP) live streaming (HLS) data stream manifest to select a highest bitrate variant provided in variant playlists;
      receiving Transport Stream (TS) files of an HLS data stream of the highest bitrate variant;
      receiving Web Video Text to Track (VTT) files containing VTT closed caption (CC) segments;
      converting the VTT closed caption segments to 608/708 closed captions based on the Consumer Technology Association (CTA) 608/708 specification;
      generating CC-enriched TS files using the TS files and the 608/708 closed captions;
      generating a single-variant reduced manifest without a VTT playlist; by a broadcasting system,
      receiving the reduced manifest in real time from the media processing system;
      using the reduced manifest to retrieve the CC-enriched TS files in real time;
      encoding Society of Cable and Telecommunications Engineers (SCTE) markers into tags of the CC-enriched TS files in real time to generate SCTE/CC-enriched TS files;
      converting the SCTE/CC-enriched TS files in real time to a real-time broadcast stream; and
      preparing the real-time broadcast stream in real time for transmission to a consumer system.

2. The server system of claim 1, wherein the server system is distributed across a network.

3. The server system of claim 1, wherein generating the CC-enriched TS files includes inserting the 608/708 closed captions into the TS files to generate the CC-enriched TS files.

4. The server system of claim 1, wherein generating the CC-enriched TS files includes generating an MP4 data stream, inserting the 608/708 closed captions into the MP4 data stream, and converting the MP4 data stream to the CC-enriched TS files.

5. The server system of claim 1, wherein the real-time broadcast stream includes a Secure Reliable Transport (SRT) stream.

6. The server system of claim 1, wherein the real-time broadcast stream includes a Real-Time Messaging Protocol (RTMP) stream.

7. The server system of claim 1, wherein the real-time broadcast stream includes a single-variant HLS stream.

8. The server system of claim 1, wherein the receiving the TS files of an HLS data stream includes receiving the TS files from a content provider system remote from the server system.

9. A method comprising:

by a media processing system, using a HyperText Transfer Protocol (HTTP) live streaming (HLS) data stream manifest to select a highest bitrate variant provided in variant playlists;

receiving Transport Stream (TS) files of an HLS data stream of the highest bitrate variant;

receiving Web Video Text to Track (VTT) files containing VTT closed caption (CC) segments;

converting the VTT closed caption segments to 608/708 closed captions based on the Consumer Technology Association (CTA) 608/708 specification;

generating CC-enriched TS files using the TS files and the 608/708 closed captions;

generating a single-variant reduced manifest without a VTT playlist; by a broadcasting system,

receiving the reduced manifest in real time from the media processing system;

using the reduced manifest to retrieve the CC-enriched TS files in real time;

encoding Society of Cable and Telecommunications Engineers (SCTE) markers into tags of the CC-enriched TS files in real time to generate SCTE/CC-enriched TS files;

converting the SCTE/CC-enriched TS files in real time to a real-time broadcast stream; and preparing the real-time broadcast stream in real time for transmission to a consumer system.

10. The method of claim 9, wherein the method is performed by a server system distributed across a network.

11. The method of claim 9, wherein generating the CC-enriched TS files includes inserting the 608/708 closed captions into the TS files to generate the CC-enriched TS files.

12. The method of claim 9, wherein generating the CC-enriched TS files includes generating an MP4 data stream, inserting the 608/708 closed captions into the MP4 data stream, and converting the MP4 data stream to the CC-enriched TS files.

13. The method of claim 9, wherein the real-time broadcast stream includes a Secure Reliable Transport (SRT) stream.

14. The method of claim 9, wherein the real-time broadcast stream includes a Real-Time Messaging Protocol (RTMP) stream.

15. The method of claim 9, wherein the real-time broadcast stream includes a single-variant HLS stream.

16. The method of claim 9, wherein the receiving the TS files of an HLS data stream includes receiving the TS files from a content provider system.

* * * * *